Aug. 27, 1968 N. D. RICHARDS 3,399,388

SUPERCONDUCTIVE INFORMATION STORAGE DEVICES

Filed Feb. 18, 1964 3 Sheets-Sheet 1

INVENTOR
NORMAN D. RICHARDS
BY
Frank R. Trifari
AGENT

Aug. 27, 1968 N. D. RICHARDS 3,399,388
SUPERCONDUCTIVE INFORMATION STORAGE DEVICES
Filed Feb. 18, 1964 3 Sheets-Sheet 2

INVENTOR
NORMAN D. RICHARDS
BY
[signature]
AGENT

INVENTOR
NORMAN D. RICHARDS
BY
AGENT

United States Patent Office 3,399,388
Patented Aug. 27, 1968

3,399,388

SUPERCONDUCTIVE INFORMATION STORAGE DEVICES

Norman Dennis Richards, Tilgate, Crawley, England, assignor to North American Philips Co., Inc., New York, N.Y.

Filed Feb. 18, 1964, Ser. No. 345,699
Claims priority, application Great Britain, Feb. 18, 1963, 6,469/63
20 Claims. (Cl. 340—173.1)

This invention relates to superconductive computer devices and, more particularly, to superconductive storage devices that use persistent currents stored in a closed loop of superconductive material.

In recent years superconductive devices have been developed that are capable of performing both logical and storage functions. Such a device is described in an article entitled, "The Cryotron—A Superconductive Computer Component," by D. A. Buck in the Proc. I.R.E. vol. 44, page 482, April 1956.

The cryotron is an active circuit element and is generally operated in liquid helium which maintains it at a temperature approaching absolute zero. The cryotron utilizes particular materials which exhibits a property such that, at temperatures below a critical temperature, the electrical resistivity changes from a finite value in the normally conductive state, to zero resistance, hereinafter called the superconductive state. Another property that these materials exhibit is the ability to return from the superconductive state to the normally conductive state of low temperature resistivity upon the application of a magnetic field above a critical value for any given temperature at which the material is normally superconductive. The critical magnetic field may be set up by a current in the superconducting material itself or in a second conductor which may or may not be superconducting, in which case the magnetic field is applied externally. The critical temperature and the critical magnetic field differ for various superconductive materials.

A basic form of cryotron comprises a superconductive device in which current in one or more input circuits (control conductors) controls the superconducting-to-normal transition in one or more output circuits (gate conductors), provided the current in each output circuit is less than the critical value. The current flowing in the control conductor is arranged to be sufficient the produce a magnetic field greater than the critical field of the gate conductor and so drive the gate conductor resistive. This change of state may be detected by monitoring the voltage across the gate conductor. By a suitable choice of materials for the control conductor and the gate conductor, a small current in the control conductor may be used to control a larger current in the gate conductor and so effect a current gain.

Preferably the gate and control conductors are made of different materials so that the gate conductor has a low critical field and a critical temperature just above the operating temperature of the device and the control conductor has a much higher critical field and critical temperature.

A development from the form of cryotron described by D. A. Buck is the "crossed film Cryotron" and comprises thin layers of films suitably insulated from each other and supported on an insulating substrate. The gate may conveniently consist of a broad strip of tin crossed at right angles by a narrower control strip of lead and insulated therefrom by a thin layer of silicon monoxide.

One of the greatest advantages to be obtained from the crossed film cryotron is the ease of fabrication of sheets of interconnected cryotrons produced by sequential vapour deposition of films through suitable masks.

A number of cryotrons may be connected in the form of a ring so as to constitute a persistent current store which is driven from a source external to the store.

In such storage arrangements the persistent current may be read out by applying a pulse to the control conductor and sensing the presence or absence of a voltage drop across the now resistive portion of the gate conductor. This voltage will decay with a time constant determined by the $L/R$ ratio of the storage cell.

For an integrating amplifier, i.e. if the pulse is short compared with the amplifier rise time, the important parameter is:

$$\int V dt = LI_s$$

where $V$ is the voltage across the resistive conductor
$L$ is the inductance of the storage element and
$I_s$ is the current stored in the storage element.

It is an object of the present invention to provide a storage element having a controlled inductance.

According to the present invention there is provided a superconductive device comprising a first point and a second point which are electrically connected by way of a first superconductive path and a second superconductive path, which paths are electrically parallel. A first conductor electrically insulated from the first and the second path is arranged to traverse said first and second paths in spaced relationship. A storage current input conductor is connected to said first point and a storage current output conductor is connected to said second point. In the arrangement a current stored as a persistent current circulating around the loop formed by the first and the second path is sensed by applying a switching signal to the first conductor. The magnitude of the switching signal is insufficient to switch the second path normally conductive but is sufficient to switch a region of the first path normally conductive so that the storage current circulating in the loop appears as a voltage across the now resistive region of the first path. This voltage decays with a time constant determined by the ratio of inductance to resistance around the loop.

A superconductive device according to the invention provides a means for varying the inductance of the loop and/or for varying the magnitude of the stored current. The integrated voltage output from the device is the product of the stored current and the loop inductance. If the device is used in a digital storage system, the inductance of the loop will be varied, whereas, in an analog storage device, the magnitude of the current may be increased up to a maximum of the critical current in the gate conductor, as well as varying the inductance of the loop, thus performing an analogue multiplication operation.

One embodiment of the invention will now be described, by way of example, with reference to the accompanying drawing in which.

Figures 1, 2, 3:
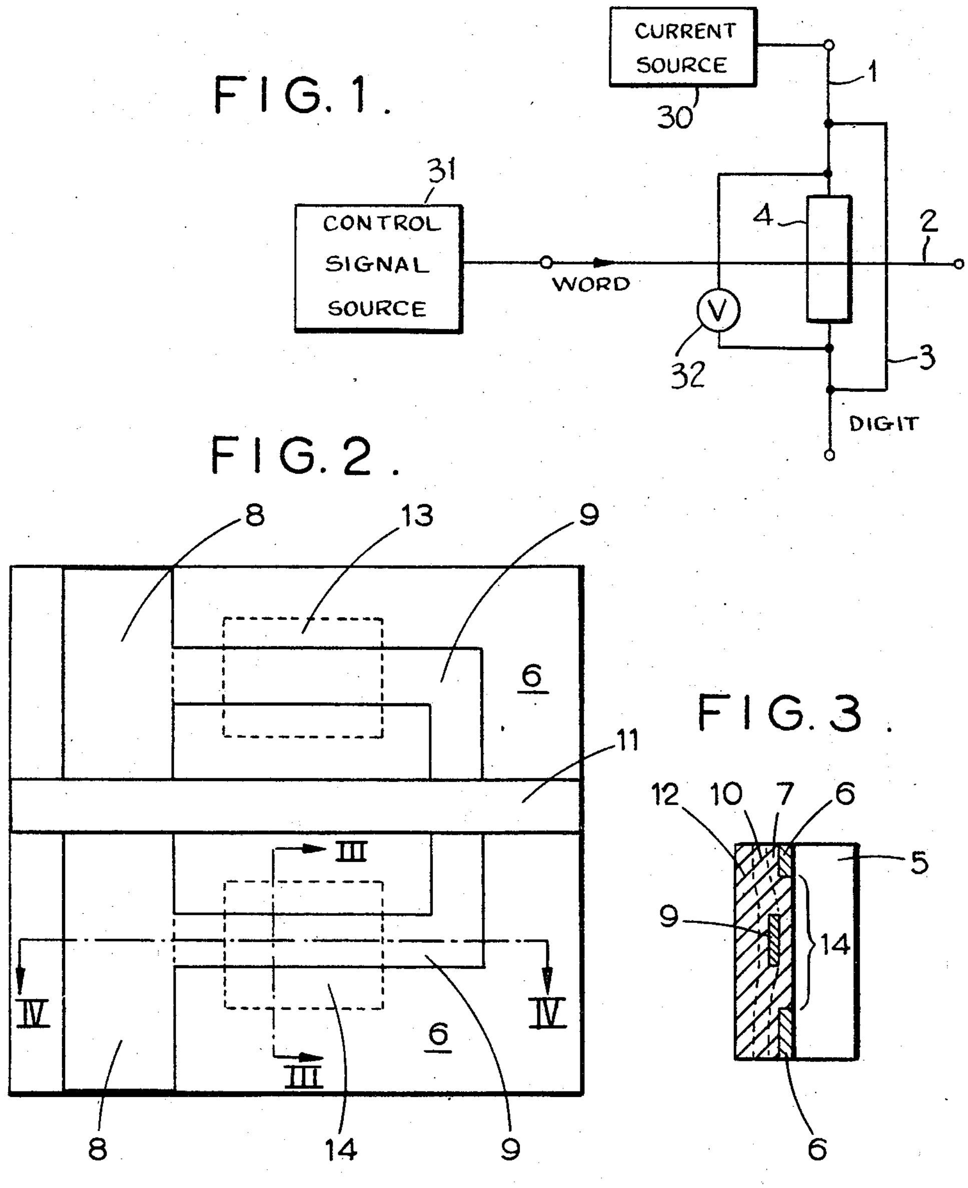
FIGURE 1 shows the circuit of a superconductive storage element.
FIGURE 2 shows a plan view of a storage element.
FIGURE 3 shows a sectional elevation of part of the storage element taken at the line III—III of FIGURE 2.

Referring now to the drawings, FIGURE 1 represents a storage element comprising a gate conductor 1, preferably of tin, crossed at right angles by a control conductor 2, preferably of lead. A loop 3, also preferably of lead, is connected to the gate conductor 1 on both sides of the switched region 4. The loop 3 is uninfluenced by current flowing in the control conductor 2 and remains superconductive. The control conductor 2 is insulated from the gate conductor 1 and the loop 3 by a thin insulating layer preferably of silicon monoxide.

If the device is cooled sufficiently so that the conductors are superconductive and a current is caused to flow in the gate conductor 1, for example, by means of a current source 30, then if a current is applied to the control conductor 2 by means of a control signal source 31 so as to cause the region 4 to become normally conductive, the current originally flowing in the gate conductor 1 will be diverted into the superconductive loop 3. If now the current in the control conductor 2 is removed, thereby causing the region 4 to become superconductive again, and the current in the gate conductor 1 is also removed, this may be considered as applying an equal but opposite current to the gate conductor 1. A circulating current now will be set up through the loop 3 and superconductive region 4 of the gate conductor 1. This circulating current is equal in magnitude to the original current in the gate conductor 1. The current will continue to circulate around the loop and its magnitude will be unaffected providing the path through which it travels remains superconductive. This, therefore, provides a digital or an analogue storage element provided that the critical current for any of the materials of the element is not exceeded by the storage current. It will be appreciated that the current may circulate in either direction dependent upon the direction of the original current in the gate conductor 1.

The stored current may be sensed by applying a current to the control conductor 2 so as to switch the region 4 into the normally conductive state and sensing the voltage drop across the region 4, for example, by means of a voltmeter 32. This is a form of destructive read out for once the region 4 is normally conductive and therefore possessing predetermined resistance, the current in the loop will decay to zero.

Figure 4:
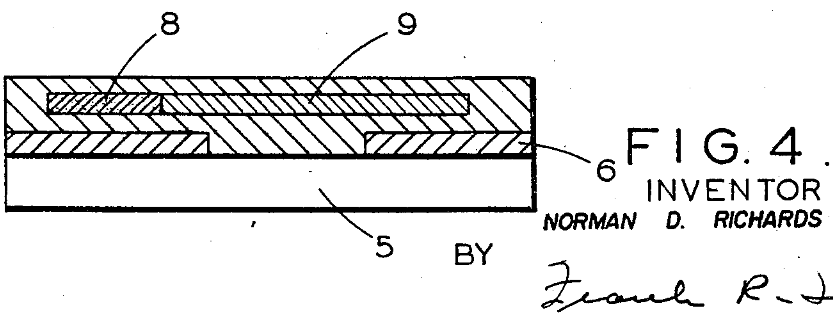
FIGURE 4 shows a sectional elevation of part of the storage element taken at the line IV—IV of FIGURE 2.

Referring now to FIGURES 2, 3 and 4, the storage element comprises a substrate 5, a lead ground plane 6, a first layer 7 of silicon monoxide, a tin gate conductor 8, a loop 9 of lead electrically connected to, and in the same plane as, the gate conductor 8, a second layer 10 of silicon monoxide, a lead control conductor 11 and a third layer 12 of silicon monoxide. The ground plane 6 is provided with apertures 13 and 14 by masking same during vapour deposition, or by electron beam machining. The gate conductor 8 and the loop 9 are preferably deposited without breaking the vacuum. This is achieved by using a vapour deposition apparatus in which the mask used for defining the conductor 8 may be automatically replaced by the mask used for defining the loop 9 without breaking the vacuum, which otherwise would allow a surface layer of oxide to form on the conductors and adversely affect the electrical connection between the conductor 8 and the loop 9.

Part of the loop 9 is arranged to be over the apertures 13 and 14 in the ground plane 6. The size of the apertures and the width of conductor forming the loop 9 will determine the inductance of the loop.

In operation the storage element is maintained in a bath of liquid helium at a temperature below the superconducting temperature of lead and tin, i.e. about 4° K.

A current flowing in the gate conductor 8 is diverted into the loop 9 by applying a current to the control conductor 11 which causes the adjacent region of the gate conductor 8 to become normally conductive. When the current in the control conductor 11 is removed the resistive region of the gate conductor 8 switches back to the superconductive state. However, the current will still continue to flow around the loop 9. When the current in the gate conductor 8 is removed, this may be considered as equivalent to applying an equal and opposite current to the gate conductor 8, a persistent current will be set up around the loop 9 in the same direction as it was originally flowing and in the opposite direction through the gate region of the gate conductor 8. This current is equal in magnitude to the initial current flowing in the gate conductor 8.

To sense the presence or absence of the persistent current, a current is applied to the control conductor 11 which causes the gate region of the gate conductor 8 to become resistive. The circulating current will cause a voltage to appear across this resistive gate region. The voltage is only a transient voltage as the current will decay with a time constant determined by the $L/R$ ratio of the loop.

When currents flow in the gate conductor 8 and loop 9, image currents will be set up in the ground plane 6. These induced currents result in a decrease in the inductance of the space between the ground plane 6 and the conductors. By providing apertures 13 and 14 in the ground plane beneath part of the loop 9, the inductance of the loop may be increased by up to 100 times and, therefore, the $L/R$ ratio of the loop and the decay time of the voltage will also be increased.

It will be appreciated that current may be stored in either direction around the loop 9 and the magnitude of the current will only be limited by the critical current of the material of the gate conductor 8, or the material of the loop 9. The read out of the current stored in the loop is a destructive form of read out.

Figure 5:
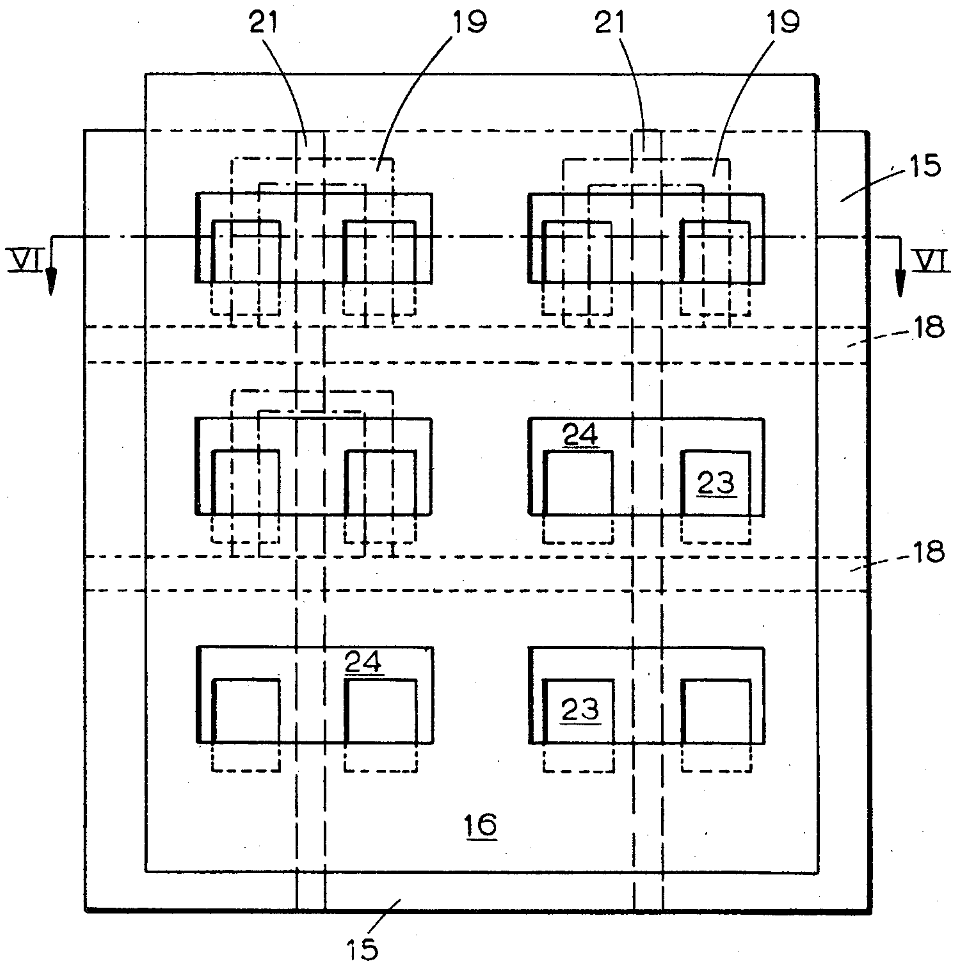
FIGURE 5 shows the arrangement of the ground plane for a matrix of storage elements having adjustable inductance.
Figure 6:
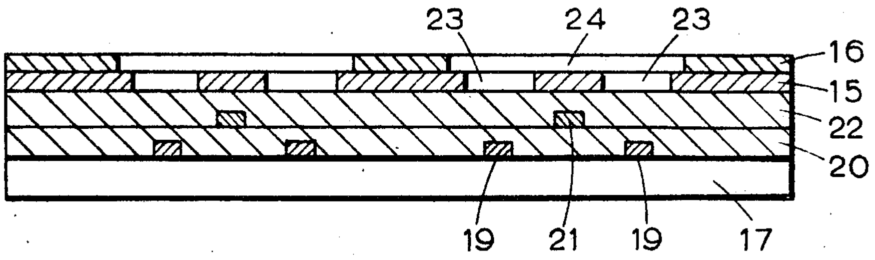
FIGURE 6 shows a sectional elevation taken at the line VI—VI of the matrix of storage elements shown in FIGURE 5.

Referring now to FIGURES 5 and 6 which comprise a number of storage elements, there is shown a first ground plane 15 and a second ground plane 16 movable relative to the first ground plane. Unlike the storage element shown in FIGURES 2, 3 and 4, the ground plane of the storage elements shown in FIGURES 5 and 6 is on the side of the current conductors remote from the substrate.

The signal to noise ratio in such a store is a function of the amplifier bandwidth and the pulse width, which is itself determined by the inductance and resistance of the storage element.

Figure 7:
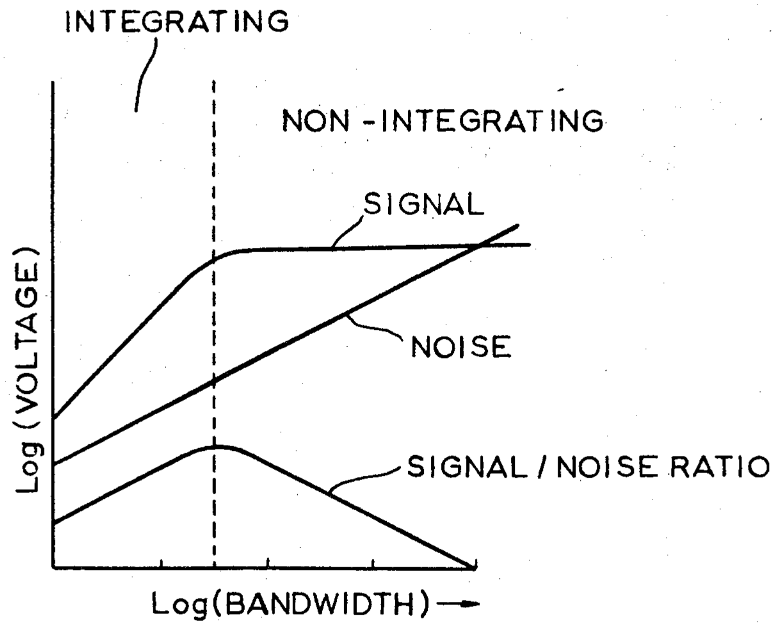
FIGURE 7 shows the pulse signal to noise ratio as a function of bandwidth.

The signal and noise amplitudes are plotted logarithmically in FIGURE 7 against the logarithm of amplifier bandwidth. The signal to noise ratio is the difference between the two curves and it will be seen that it is a maximum at the transition between the integrating and non integrating condition, i.e. the amplifier gives optimum signal to noise ratio when its rise time is comparable with the pulse width.

The pulse width of the storage element output voltage will depend upon the mode of switching. If the gate of the element is driven resistive instantaneously by the word current, the pulse width will be approximately equal to the $L/R$ time constant of the storage element.

In practice the transition time from the normal to superconducting state of the gate will not be infinitely short and will depend upon such factors as the word conductor time constant, the amount of overdrive, the width of the resistance transition and whether or not there is any thermal switching in the gate. In the absence of thermal switching an approximate analysis shows that if the transition time T for the storage element to become resistive is longer than $L/R$, then the storage element output voltage pulse width is given by:

$$t_s=\sqrt{\frac{2TL}{R}}$$

So as to clarify FIGURE 5, only three storage elements are shown. The elements are formed on a substrate 17 by depositing gate conductors 18 and loop conductors 19, coating these conductors with a layer 20 of silicon monoxide, depositing control conductors 21, coating these conductors with a layer 22 of silicon monoxide, and applying to the layer 22 the first ground plane 15 of lead in which holes 23 are provided. The second ground plane 16 is produced independently and holes 24 are provided in the second ground plane 16 either by masking or electron beam machining before the ground plane 16 is welded on the ground plane 15.

By adjusting the position of the ground plane 16 in relation to the ground plane 15, the effective sizes of the apertures 23 are controlled. The ground plane 16 may be adjusted relative to the ground plane 15 either before or during operation of the device. In certain cases it will be preferable to support the ground plane 16 on a substrate (not shown). The operation of the storage elements is substantially as described with reference to FIGURES 1, 2, 3 and 4.

The apertures 24 in the ground plane 16 need not be of the form shown and a number of interchangeable ground planes may be provided.

What I claim is:

1. A superconductive device comprising a first superconductive path interconnecting a first point and a second point, a second superconductive path electrically connected in parallel with said first path between said first and second points and forming therewith a closed superconductive loop, input means for supplying current to said first path, a conductor electrically insulated from said first and second paths and arranged in crossover relationship with said first and second paths, means including said conductor for applying a magnetic field to said loop to selectively switch a portion thereof between the normally conductive and superconductive states thereby to produce a persistent circulating current in said loop, a superconductive ground plane having a subtsantial surface area facing and disposed closely adjacent said loop, said ground plane having an aperture therein which spans a portion of said second superconductive path, the inductance of said loop being partly determined by the dimensions of said aperture, and means for sensing said circulating current comprising means for causing a portion of said superconductive loop to become normally conductive thereby to produce a transient decay of said circulating current having a time constant determied by the inductance of said loop.

2. Apparatus as described in claim 1 wherein said conductor is composed of the same superconductive material as said second path.

3. A superconductive device comprising a support, a first path composed of a thin layer of superconductive material thereon, a second path composed of a thin layer of superconductive material thereon and electrically connected in parallel with said first path to form a closed superconductive loop, input means for producing a current flow in said first path, a control conductor electrically insulated from said first and second paths and arranged in crossover relationship with said first and second paths, means for producing a persistent circulating current in said superconductive loop, said control conductor being adapted to receive an input signal and produce a magnetic field, said first and second paths being differently responsive to said magnetic field whereby a region of said first path is switched from the superconductive to the normally conductive state and said second path remains superconductive, and a superconductive ground plane disposed close to and insulated from said loop and having an aperture therein in registration with a portion of said second superconductive path thereby to modify the magnetic field in the vicinity of said aperture.

4. Apparatus as described in claim 3 further comprising means for adjusting the size of said aperture thereby to change the inductance of said loop.

5. Apparatus as described in claim 4 wherein said adjusting means comprises a second superconductive ground plane positioned adjacent to said first ground plane.

6. A superconductive device comprising a substrate, a first path adapted to be connected in an electrical circuit and composed of a thin layer of superconductive material supported on said substrate, input means of said first path for supplying a current flow therein, a second path composed of a thin layer of superconductive material supported on said substrate and electrically connected in parallel with said first path to form a closed loop, a conductor comprising a thin layer of superconductive material electrically insulated from said first and second paths and arranged in crossover relationship with said first and second paths, means for producing a persistent circulating current in said loop, means including said conductor for switching a portion of said first path which is included in said loop from the superconductive to the normally conductive state thereby to cause said circulating current to decay with a time constant determined by the $L/R$ ratio of the loop, wherein L is the inductance of the loop and R is the resistance thereof, and a first superconductive ground plane facing and disposed closely adjacent said loop for modifying the magnetic field thereabout, said ground plane including an aperture therein located in alignment with a portion of said second path.

7. Apparatus as described in claim 6 further comprising a second superconductive ground plane positioned adjacent said first ground plane, said first and second ground planes being adapted to move relative to one another so as to vary the effective size of said aperture.

8. Apparatus as described in claim 7 wherein said first path is composed of a first superconductive material having a given critical magnetic field value and said second path is composed of a second different superconductive material having a higher critical magnetic field value than said first material.

9. Apparatus as described in claim 7 wherein said second ground plane includes an aperture therein positioned opposite the aperture of said first ground plane and wherein the relative movement of said ground planes varies the alignment between the apertures in said first and second ground planes.

10. Apparatus as described in claim 6 further comprising a second superconductive ground plane having an aperture therein and positioned adjacent said first ground plane so that the apertures of said first and second ground planes are in a given condition of alignment.

11. A superconductive device comprising a substrate, a superconductive ground plane having an aperture therein and supported by said substrate, a thin layer of insulative material over said ground plane, a first path composed of a thin layer of superconductive material over said insulative layer, input means for said first path for supplying a current flow therein, a second path composed of a thin layer of superconductive material over said insulative layer and positioned so that a portion of said second path is over said aperture, said second path being electrically connected in parallel with said first path to form a closed superconductive loop, a second thin layer of insulative material over said first and second paths, a control conductor over said second insulative layer and positioned to cross said first and second paths, means for producing a persistent circulating current in said superconductive loop, and means for sensing said circulating current comprising means including said control conductor for applying a magnetic field to said first and second paths, said first and second paths being differently responsive to said magnetic field whereby a portion of said first path is switched into the normally conductive state and said second path remains in the superconductive state, whereby said circulating current is caused to decay and produce a voltage across the normally conductive portion of said first path.

12. Apparatus as described in claim 11 wherein said control conductor crosses said first and second paths at right angles and wherein said first path is composed of a first superconductive material having a given critical magnetic field value and said second path is composed of a second superconductive material having a different critical magnetic field value than said first material.

13. A superconductive device comprising a substrate, a first path composed of a thin layer of superconductive material supported on said substrate, input means for said first path for supplying a current flow therein, a second path composed of a thin layer of superconductive material supported on said substrate and electrically connected in parallel with said first path to form a closed superconductive loop, a thin layer of insulative material over said first and second paths, a control conductor over said insulative layer and positioned to cross said first and second paths, means for producing a persistent circulating current in said superconductive loop, a second thin layer of insulative material over said control conductor, a first superconductive ground plane positioned over said second insulative layer and having an aperture therein opposite a portion of said second path, a second superconductive ground plane positioned on said first ground plane and adapted to move relative thereto so as to alter the effective size of said aperture, and means for sensing said circulating current comprising means including said control conductor for applying a magnetic field to said first and second paths of a magnitude to switch a portion of said first path into the normally conductive state but insufficient to switch said second path into the normally conductive state whereby said circulating current is caused to decay and produce a voltage across the normally conductive portion of said first path.

14. Apparatus as described in claim 13 wherein said second ground plane has an aperture therein overlapping at least a portion of said aperture of said first ground plane and wherein said second ground plane is adapted to move in a direction parallel to the plane of said first superconductive ground plane.

15. A superconductive device comprising a first superconductive path interconnecting a first point and a second point, a second superconductive path electrically connected in parallel with said first path between said first and second points and forming therewith a closed superconductive loop, input means for supplying current to said first path, means for switching a portion of said first path into the normally conductive state thereby to direct the current therein to said second path, means including said switching means for switching said portion of said first path back into the superconductive state and simultaneously removing said supply current from said input means thereby to produce a persistent circulating current in said superconductive loop, means for causing a portion of said superconductive loop to become normally conductive thereby to produce a decay of said circulating current, and a superconductive ground plane adjacent said loop and having an aperture therein located opposite a portion of said second path for modifying the inductance of said loop.

16. A superconductive storage matrix comprising a substrate, a plurality of superconductive storage elements supported thereon, each of said storage elements comprising a first path composed of a thin layer of superconductive material and a second path composed of a thin layer of superconductive material and electrically connected in parallel with said first path to form a closed superconductive loop, a control conductor electrically insulated from and arranged in crossover relationship with the first and second paths of a plurality of said storage elements, means for producing a persistent circulating current in selected ones of said storage elements, a superconductive ground plane disposed close to and insulated from said superconductive elements and having a plurality of apertures therein positioned opposite a predetermined portion of the second superconductive path of said storage elements, and means for sensing the presence or absence of a circulating current in said storage elements comprising means for applying an input signal to said conductor for switching a portion of the superconductive loops of said plurality of storage elements into the normally conductive state.

17. Apparatus as described in claim 16 further comprising a second superconductive ground plane positioned adjacent to said first ground plane and having a plurality of apertures therein positioned in the vicinity of the apertures of said first ground plane.

18. Apparatus as described in claim 17 wherein said first and second ground planes are adapted to move relative to one another so as to vary the effective size of said apertures.

19. Apparatus as described in claim 16 wherein each of said first paths of said superconductive storage elements is composed of a first superconductive material having a given critical magnetic field value and each of said second paths is composed of a second different superconductive material having a higher critical magnetic field value than that of said first material.

20. Apparatus as described in claim 16 further comprising means for connecting said first paths of a plurality of said superconductive storage elements in series circuit.

References Cited

UNITED STATES PATETNS

| | | | |
|---|---|---|---|
| 2,913,881 | 11/1959 | Garwin | 340—173.1 |
| 3,082,408 | 3/1963 | Garwin | 340—173.1 |
| 3,135,946 | 6/1964 | Miller | 340—173.1 X |
| 3,086,130 | 4/1963 | Meyers | 340—173.1 X |

OTHER REFERENCES

Smallman et al.: Thin Film Cryotrons, Proceedings of the IRE, September 1960; pp. 1562–82.

TERRELL W. FEARS, *Primary Examiner.*